United States Patent
Shiobara et al.

(10) Patent No.: US 6,266,653 B1
(45) Date of Patent: Jul. 24, 2001

(54) APPARATUS AND METHOD FOR MANAGING AND POSSESSING ELECTRONIC MONEY, MANAGEMENT AND POSSESSION MEDIUM AND RECORDING MEDIUM FOR RECORDING ELECTRONIC MONEY MANAGEMENT AND POSSESSION PROGRAM READ BY COMPUTER

(75) Inventors: Tomomi Shiobara; Koken Yamamoto; Akiko Ono, all of Kawasaki (JP)

(73) Assignee: Fujitsu Limited, Kanawaga (JP)

(*) Notice: Subject to any disclaimer, the term of this patent is extended or adjusted under 35 U.S.C. 154(b) by 0 days.

(21) Appl. No.: 09/039,268

(22) Filed: Mar. 16, 1998

(30) Foreign Application Priority Data

Oct. 16, 1997 (JP) .................................... 9-284123

(51) Int. Cl.$^7$ ...................................................... G06F 17/60
(52) U.S. Cl. ............................. 705/41; 705/35; 705/39; 705/40; 705/43; 235/375; 235/379; 235/380; 150/112; 150/131
(58) Field of Search .................................. 705/39, 35, 41, 705/43, 40; 235/379, 375, 380; 380/24; 150/112, 113, 116, 117, 131

(56) References Cited

U.S. PATENT DOCUMENTS

| | | | | |
|---|---|---|---|---|
| 3,980,116 | * | 9/1976 | Edwards | 150/113 |
| 4,906,828 | * | 3/1990 | Halpern | 235/379 |
| 4,959,788 | * | 9/1990 | Nagata et al. | 705/41 |
| 5,144,115 | * | 9/1992 | Yoshida | 705/41 |
| 5,544,086 | * | 8/1996 | Davis et al. | 380/24 |
| 5,566,327 | * | 10/1996 | Sehr | 707/104 |
| 5,649,118 | | 7/1997 | Carlisle et al. | 705/41 |
| 5,704,046 | * | 12/1997 | Hogan | 705/39 |
| 5,745,886 | * | 4/1998 | Rosen | 705/39 |
| 5,864,830 | * | 1/1999 | Armetta et al. | 705/41 |
| 5,893,080 | * | 4/1999 | McGurl et al. | 705/40 |
| 5,897,625 | * | 4/1999 | Gustin et al. | 705/43 |
| 5,913,203 | * | 6/1999 | Wong et al. | 705/39 |
| 5,915,023 | * | 6/1999 | Bernstein | 380/24 |
| 5,924,084 | * | 7/1999 | De Rooij | 705/39 |
| 6,016,484 | | 1/2000 | Williams et al. | 705/39 |

FOREIGN PATENT DOCUMENTS

| | | | |
|---|---|---|---|
| 793205 | 9/1997 | (EP) | G07F/0/07 |
| WO 97/41537 | * | 6/1997 | (WO) . |

OTHER PUBLICATIONS

Gemplus Gemvision: Gemplus introduces the Gemvision Family of MultiOApplications Smart cards and Value–Added Services 1997.

* cited by examiner

Primary Examiner—Emanuel Todd Voeltz
Assistant Examiner—Raquel Alvarez
(74) Attorney, Agent, or Firm—Arent Fox Kintner Plotkin & Kahn, PLLC

(57) ABSTRACT

The present invention discloses an electronic money managing and possessing apparatus used for managing and possessing electronic money, which includes a medium for holding an electronic money defined as an electronic symbol of currency in a required storage so as to be rewritten when currency of a single kind is used, and electronic money distribution and storage control unit for setting a plurality of storage areas defined according to individual purposes in the storage of the medium and distributing and storing the electronic money in the plurality of storage areas according to purposes as instructed and electronic money payment executing unit for specifying, regarding the electronic money possessed in the medium, a desired storage area and executing payment with the electronic money stored in this specified storage area. Even if currency of only a single kind is used, electronic money can be classified and managed according to various purposes. Accordingly, the degree of convenience can be increased for using electronic money.

10 Claims, 19 Drawing Sheets

720: CUSTOMER IC CARD R/W

FIG. 8

| | POCKET NUMBER | USING STATE | CURRENCY | BALANCE | LENDING INFORMATION | | BORROWING INFORMATION | | LOCK | NOTES/ PURPOSES |
|---|---|---|---|---|---|---|---|---|---|---|
| | | | | | AMOUNT | POCKET | AMOUNT | POCKET | | |
| 301-1 | P1 | 1 | ¥ | 2300 | 700 | P2 | — | — | OFF | FOOD EXPENSES |
| 301-2 | P2 | 0 | ¥ | 0 | — | — | 700 | P1 | OFF | SOCIAL EXPENSES |
| 301-3 | P3 | 0 | ¥ | 10000 | — | — | — | — | ON | PUBLIC UTILITY CHARGES |
| 301-4 | P4 | 0 | ¥ | 5000 | — | — | — | — | OFF | GENERAL EXPENSES |
| 301-5 | P5 | 0 | $ | 80 | | | | | ON | |
| | ..... | | | | | | | | | |
| 301-N | Pn | — | — | — | — | — | — | — | — | — |

```
AMOUNT      ¥ 800
PAYMENT     ELECTRONIC
            MONEY

[CASH] [CREDIT  ] [ELECTRONIC]
       [CARD    ] [MONEY     ]
```
711

FIG.10

```
AMOUNT      ¥ 800
BALANCE     ¥2300        [FOOD    ]
                         [EXPENSES]
SETTLE  FROM  HERE ?

[CHANGE ] [DISPLAY POCKET] [DECIDE]
[POCKET] [CONTENT       ]
```
712

FIG.13

| POCKET NUMBER | USING STATE | CURRENCY | BALANCE | LENDING INFORMATION | | BORROWING INFORMATION | | LOCK | NOTES/ PURPOSES |
|---|---|---|---|---|---|---|---|---|---|
| | | | | AMOUNT | POCKET | AMOUNT | POCKET | | |
| P1 | 1 | ¥ | 1500 | 700 | P2 | — | — | OFF | FOOD EXPENSES |
| P2 | 0 | ¥ | 0 | — | — | 700 | P1 | OFF | SOCIAL EXPENSES |
| P3 | 0 | ¥ | 10000 | — | — | — | — | ON | PUBLIC UTILITY CHARGES |
| .... | | | | | | | | | |
| Pn | — | — | — | — | — | — | — | — | — |

| POCKET NUMBER | USING STATE | CURRENCY | BALANCE | LENDING INFORMATION | | BORROWING INFORMATION | | LOCK | NOTES/ PURPOSES |
|---|---|---|---|---|---|---|---|---|---|
| | | | | AMOUNT | POCKET | AMOUNT | POCKET | | |
| P1 | 0 | ¥ | 1500 | 700 | P2 | — | — | OFF | FOOD EXPENSES |
| P2 | 0 | ¥ | 0 | — | — | 700 | P1 | OFF | SOCIAL EXPENSES |
| P3 | 1 | ¥ | 10000 | — | — | — | — | ON | PUBLIC UTILITY CHARGES |
| P4 | 0 | ¥ | 5000 | — | — | — | — | OFF | GENERAL EXPENSES |
| P5 | 0 | $ | 80 | — | — | — | — | ON | |
| .... | | | | | | | | | |
| Pn | — | — | — | — | — | — | — | — | — |

```
ELECTRONIC MONEY BREAKDOWN IS AS FOLLOWS

1    ¥1500     FOOD EXPENSES
    2      ¥0     SOCIAL EXPENSES
    3   ¥10000    PUBLIC UTILITY CHARGES
    4    ¥5000    GENERAL EXPENSES
    5     $80
_____

SELECT TRANSACTION

[WITHDRAW]   [DEPOSIT]   [TRANSFER]
   [BALANCE  ]  [SETTING]
   [INQUIRY  ]  [CHANGE ]
                                   [CANCEL]
```

```
DEPOSIT MONEY IN INVERTED POCKET
IF OK, SELECT "DECIDE"
FOR CHANGING TO ANOTHER POCKET, SELECT
"SETTING CHANGE"

1    ¥1500     FOOD EXPENSES
    2    ¥0        SOCIAL EXPENSES
    3    ¥10000    PUBLIC UTILITY EXPENSES
    4    ¥5000     GENERAL EXPENSES
    5    $80

[SETTING CHANGE]              [DECIDE]
```

```
SELECT POCKET FOR DEPOSITING

1    ¥1500   FOOD EXPENSES
    2       ¥0   SOCIAL EXPENSES
    3   ¥10000   PUBLIC UTILITY EXPENSES
    4    ¥5000   GENERAL EXPENSES
    5      $80
    6
    7
    8

[SELECT]                    [DECIDE]
```

CURRENT SETTING CONTENT OF POCKET 6 IS AS FOLLOWS
FOR CHANGING NOTES, SELECT "DECIDE"

BALANCE   —
CURRENCY  —

NOTES
- FOOD EXPENSES
- GENERAL EXPENSES
- OTHERS
- NO CONTENT CHANGE
- FUEL AND LIGHT EXPENSES
- SOCIAL EXPENSES
- NO NOTES

[CANCEL]                    [DECIDE]

501

APPARATUS AND METHOD FOR MANAGING AND POSSESSING ELECTRONIC MONEY, MANAGEMENT AND POSSESSION MEDIUM AND RECORDING MEDIUM FOR RECORDING ELECTRONIC MONEY MANAGEMENT AND POSSESSION PROGRAM READ BY COMPUTER

BACKGROUND OF THE INVENTION (1) Field of the Invention

The present invention relates to an apparatus and a method suitably used for managing and possessing electronic money which is defined as an electronic symbol of currency, and a management and possession medium. The invention also relates to a recording medium for recording electronic money management and possession programs to be read by a computer.

(2) Description of the Related Art

In recent years, we have seen the developments of electronic money systems which enable business transactions to be made without using any cash. For an electronic money management and possession medium (electronic money transportable medium), a card unit (card type storage medium), more particularly an IC card incorporating an integrated circuit (IC), is usually used.

This IC card includes a data memory for storing electronic money. In order to classify electronic money according to currency and store the same, the data memory includes a storage area formed to store electronic money for each currency. For example, the data memory has storage areas including an area for Japanese yen, an area for US dollars, an area for German marks, and so on, which are formed to store electronic money according to currency groups.

With an IC card as an electronic money management and possession medium, the use of electronic money instead of cash leaves no unsettled accounts unlike the case of credits. Safety can also be increased if a security function is added. Further, since all the users can carry electronic money just like a purse (cash), different from the case of cash cards (and bankbooks), for example three or more members of a family can share one account.

In the near future, with the widespread use of electronic money, we may even be able to feel as if we are using cash when using electronic money. Accordingly, in our daily lives, we may mostly use an IC card as an electronic money management and possession medium which stores currency of only a single kind (i.e., currency of our own country).

However, there is a problem inherent in such a general IC card used as an electronic money management and possession medium. As described above, the data memory for storing electronic money includes a storage area formed for each currency. Consequently, electronic money is stored in a particular storage area corresponding to its currency without being classified.

For electronic money, one balance collected for each storage area can only be understood by numerical values. Consequently, if currency of only a single kind is used, electronic money cannot be classified and managed for various purposes. In other words, cash can be managed to be classified and used according to various purposes. For example, cash for food expenses is kept in one side of a partitioned purse and spare cash in another side, and the classified cash is used for each particular purpose. Different from cash, however, electronic money cannot be classified or managed according to various purposes because a balance can only be understood by numerical values.

Therefore, if electronic money is used, for example, even if we try to keep 5,000 yen as spare electronic money, we may use this money for food expenses without knowing it. Thus, the difficulty of planned management of electronic money is a problem to be solved for the general IC card.

SUMMARY OF THE INVENTION

The present invention was made in order to solve the problem discussed above. It is an object of the present invention to provide an apparatus and a method for managing and possessing electronic money and a management and possession medium, which can increase the degree of convenience of using electronic money by classifying and managing electronic money according to various purposes even if currency of only a single kind is used. It is another object of the invention to provide a recording medium for storing electronic money management and possession programs to be read by a computer. Based on these programs, the computer can execute a procedure for managing electronic money for various purposes.

The electronic money managing and possessing apparatus includes a medium for holding electronic money defined as an electronic symbol of currency in a required storage so as to be rewritten regarding currency of a single kind, electronic money distribution and storage control means for setting a plurality of storage areas defined according to individual purposes in the storage of the medium and distributing and storing electronic money in the plurality of storage areas according to purposes as instructed, and electronic money payment executing means for specifying, regarding electronic money possessed in the medium, a desired storage area and executing payment by using the electronic money stored in the specified storage area.

In the electronic money managing and possessing apparatus, the electronic money distribution and storage control means can include, for reading electronic money from the outside and receiving and storing this electronic money in the medium, specifying means for specifying a desired storage area and storing means for storing the electronic money in the storage area specified by the specifying means.

In the electronic money managing and possessing apparatus, the electronic money distribution and storage control means can include, for moving electronic money possessed in the medium among the plurality of storage areas, specifying means for specifying at least one of a storage area as a transfer origin and a storage area as a transfer destination, and moving means for moving the electronic money from the storage area as a transfer origin to the storage area as a transfer destination specified by the specifying means.

In the electronic money managing and possessing apparatus, the electronic money payment executing means can include, for executing payment by using the electronic money possessed in the medium and if payment cannot be made by using the electronic money stored in the specified storage area because of its shortage, specifying means for specifying another storage area, and moving means for moving electronic money from the storage area specified by this specifying means to the storage area where the shortage has occurred. In this managing and possessing apparatus, the electronic money payment executing means may include, for moving the electronic money from another storage area to the storage area where the shortage has occurred, loan and debt information recording means for recording lending and borrowing information in the medium. This electronic money managing and possessing apparatus may include displaying means for displaying lending and borrowing information.

In the electronic money managing and possessing apparatus, the electronic money payment executing means may include, for executing payment by using the electronic money possessed in the medium and if payment cannot be made by using the electronic money stored in the specified storage area because of its shortage, specifying means for specifying another storage area and moving means for moving electronic money from the storage area specified by this specifying means to the storage area where the shortage has occurred. The electronic money distribution and storage control means may include, for reading electronic money from the outside and receiving and storing this electronic money in the medium, settling means for storing electronic money equivalent to the amount of the shortage in another storage area and settling the shortage.

The electronic money managing and possessing apparatus can include prohibiting means for prohibiting the electronic money distribution and storage control means and the electronic money payment executing means to write and read electronic money from the storage area.

The electronic money managing and possessing method of the present invention enables electronic money to be possessed in a medium by distributing and storing electronic money in a plurality of storage areas according to purposes as instructed, the plurality of storage areas being defined according to individual purposes in the storing unit of the medium which can hold the electronic money defined as an electronic symbol of currency in the required storage so as to be rewritten when currency of a single kind is used.

In the electronic money managing and possessing method, for making payment by using the electronic money possessed in the medium, payment may be executed by specifying a desired storage area and using electronic money stored in the specified storage area.

In the electronic money managing and possessing method, for reading electronic money from the outside and receiving and storing this electronic money in the medium, a desired storage area may be specified and the electronic money may be stored in this specified storage area.

In the electronic money managing and possessing method, for moving the electronic money possessed in the medium among the plurality of storage areas, at least one of a storage area as a transfer origin and a storage area as a transfer destination may be specified and then the electronic money may be moved from the storage area as a transfer origin to the storage area as a transfer destination.

In the electronic money managing and possessing method, for executing payment by using the electronic money possessed in the medium and if payment cannot be made by using the electronic money stored in the specified storage area because of its shortage, another storage area may be specified and then electronic money may be moved from this specified storage area to the storage area where the shortage has occurred.

In the electronic money managing and possessing method, for moving the electronic money from another specified storage area to the storage area where the shortage has occurred, lending and borrowing information may be recorded in the medium. In this case, the lending and borrowing information may be displayed.

In the electronic money managing and possessing method, for reading electronic money from the outside and receiving and storing the same in the medium after the electronic money has been moved from another specified storage area to the storage area where the shortage has occurred, electronic money equivalent to the amount of the shortage may be stored in the specified storage area and then the shortage may be settled.

The medium included in the electronic money managing and possessing apparatus of the present invention can hold electronic money defined as an electronic symbol of currency in a required storage so as to be rewritten. In the storage of this medium, a plurality of storage areas defined according to individual purposes are set when currency of a single kind is used. Electronic money is distributed and stored in the plurality of storage areas according to purposes as instructed.

Furthermore, the present invention provides a recording medium for recording electronic money management and possession programs to be read by a computer. This recording medium records electronic money management and possession programs for causing the computer to execute an electronic money distribution and storage control procedure for distributing and storing electronic money defined as an electronic symbol of currency in a plurality of storage areas according to purposes as instructed, the plurality of storage areas being defined according to individual purposes in the storage of a medium for holding electronic money in the required storage so as to be rewritten when currency of a single kind is used, and an electronic money payment executing procedure for specifying, regarding electronic money possessed in the medium, a desired storage area and executing payment by using electronic money stored in this specified storage area.

With the apparatus and the method for managing and possessing electronic money, the management and possession medium, and the recording medium for recording electronic money management and possession programs to be read by a computer, which are all provided by the present invention, electronic money can be classified and managed according to purposes, even if currency of only a single kind is used, by distributing and storing the electronic money in the plurality of storage areas according to purposes as instructed regarding currency of a single kind and executing payment by using the electronic money stored in the desired storage area. Accordingly, we can use electronic money feeling as if we are using cash divided according to purposes, and the degree of its convenience can be increased.

According to the present invention, lending and borrowing information can be recorded in the medium when electronic money is moved from another storage area to the storage area where the shortage has occurred. Accordingly, among electronic money managed according to purposes, information regarding the occurrence of lending and borrowing can be managed, and management and use of the electronic money can be facilitated.

BRIEF DESCRIPTION OF THE DRAWINGS

These and other objects, features and advantages of the present invention will become more apparent upon reading of the following detailed description and drawings, in which:

FIG. 8 is a view showing a constitutional example of a storing unit;

FIG. 9 is a view showing a display screen of a POS main body of the POS system in the electronic money managing and possessing apparatus of the embodiment of the invention;

FIGS. 10 and 11 are views each showing a display screen of a customer IC card reader/writer of the POS system in the electronic money managing and possessing apparatus of the embodiment of the invention;

FIG. 13 is a view showing another constitutional example of the storing unit;

FIGS. 15 to 19 are views each showing a display screen example of the electronic money automatic teller machine in the electronic money managing and possessing apparatus of the embodiment of the invention.

DESCRIPTION OF THE PREFERRED EMBODIMENTS

This section describes an electronic money managing and possessing method according to an embodiment of the present invention with reference to the accompanying drawings.

Figure 1:
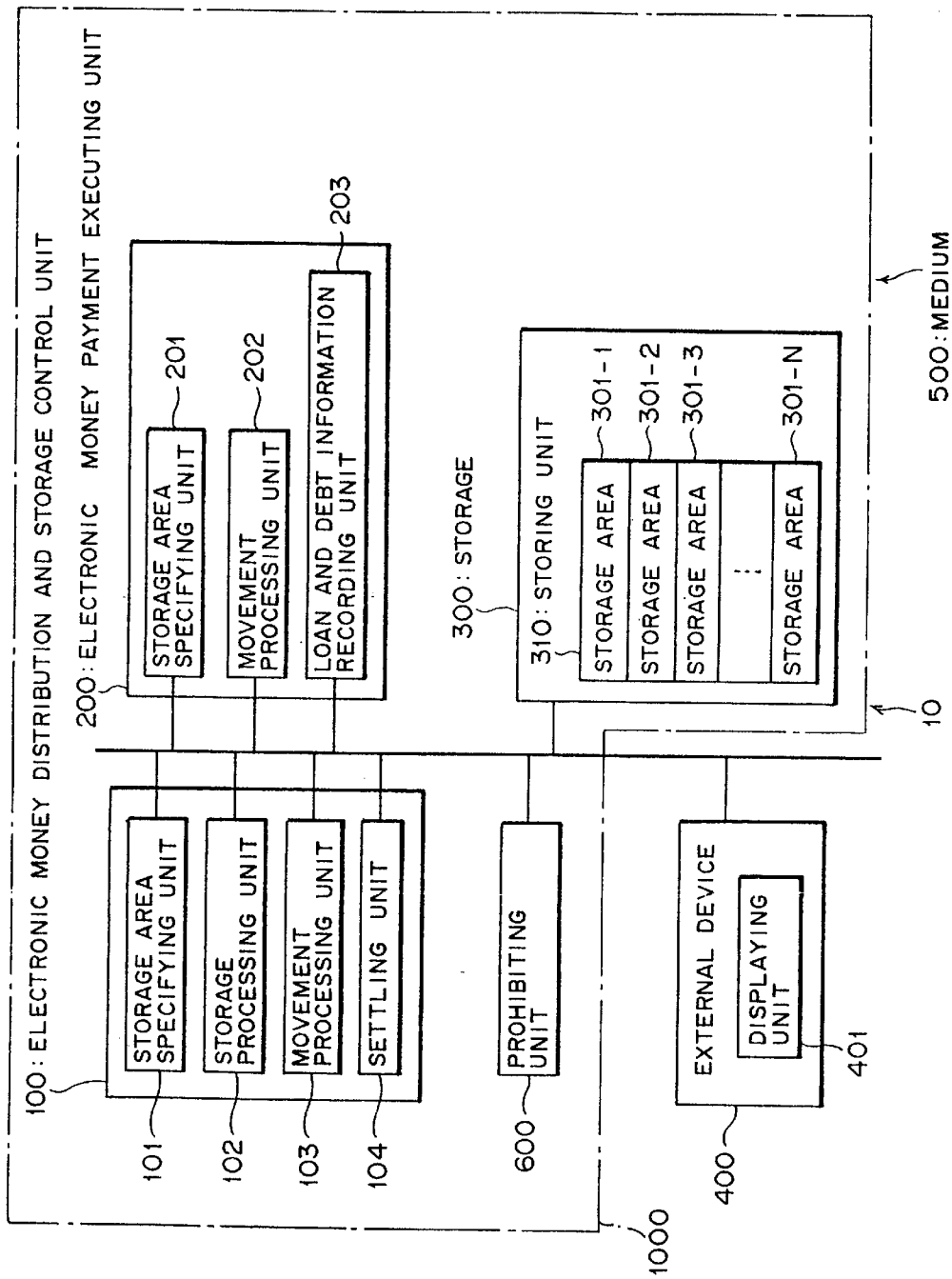
FIG. 1 is a functional block diagram showing a constitution of an electronic money managing and possessing apparatus of an embodiment of the present invention.

(a) Constitution of Electronic Money Managing and Possessing Apparatus of the Embodiment of the Present Invention (a1) Constitution of electronic money managing and possessing apparatus Referring to FIG. 1 which is a functional block diagram, there is shown a constitution of the electronic money managing and possessing apparatus of the embodiment of the present invention. An electronic money managing and possessing apparatus 10 shown in FIG. 1 manages and possesses electronic money defined as an electronic symbol of currency for various purposes when currency of a single kind is used. The electronic money managing and possessing apparatus 10 comprises in combination an IC card 1000 as an electronic money management and possession medium (electronic money transportable medium) and an external device 400 such as a later-described point of sales (POS) system or an electronic purse and electronic money automatic teller machine (ATM). A mode of combination between the IC card 1000 as an electronic money management and possession medium and the external device 400 will be described later in a subsection (a2).

The IC card 1000 described herein includes a function as a medium 500 for holding electronic money in a required storage 300 so as to be rewritten when currency of a single kind is used.

First, the hardware configuration of the IC card 1000 will be described by referring to FIG. 2. The IC card 1000 includes a micro processor unit (MPU) 2, a data memory 3 and a connecting unit 4.

The MPU 2 includes a read only memory (ROM) 23, a random access memory (RAM) 24, a control unit 21 and an operation unit 22. Programs for driving the control unit 21 and the operation unit 22 are recorded in the ROM 23. In the MPU 2, by actuating the control unit 21 and the operation unit 22 according to the programs in the ROM 23, data regarding receiving/paying of electronic money from an external device not shown in FIG. 2 and calculation data obtained by calculation performed by the operation unit 22 based on the electronic money receiving/paying data are temporarily stored in the RAM 24, or transferred to the data memory 3 or to the external device via the connecting unit 4. In this way, the IC card 1000 is actuated.

The data memory 3 stores information for the amount of electronic money including the result of calculation performed in the MPU 2, and includes a programmable ROM (PROM).

In other words, the data memory 3 has a function for storing electronic money. Specifically, as described in detail later, in the data memory 3, in order to classify and store electronic money according to various purposes when currency of a single kind is used, a plurality of storage areas are formed for storing electronic money based on purposes.

Figure 2:
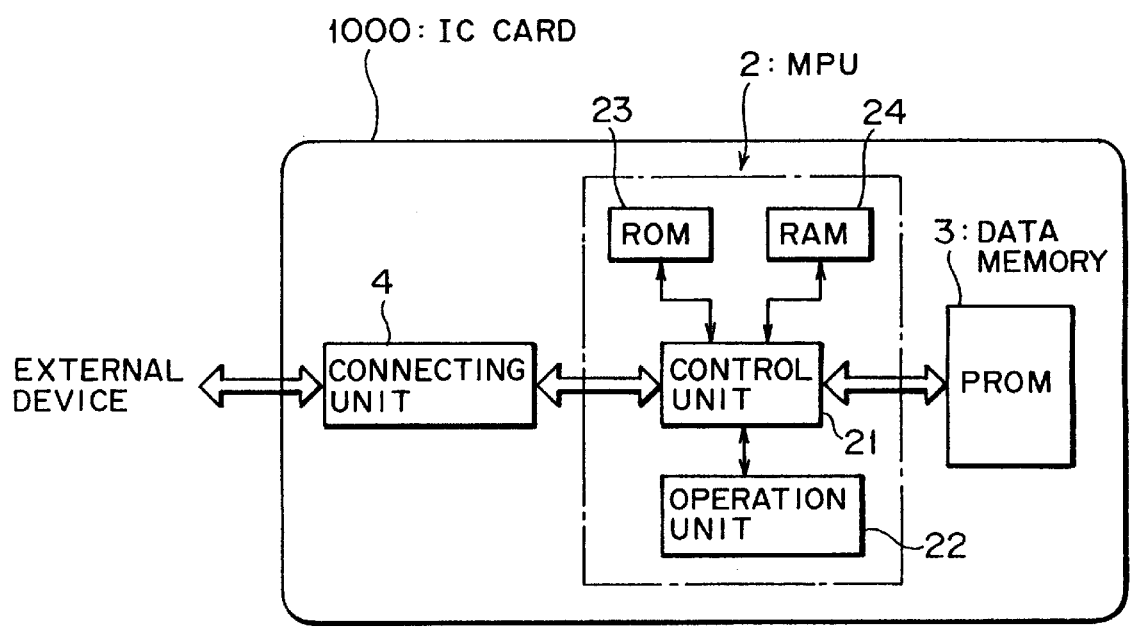
FIG. 2 is a typical view showing a hardware configuration of an IC card in the electronic money managing and possessing apparatus of the embodiment of the invention.

The connecting unit 4 is an electrode unit connected to the external device (not shown in FIG. 2). The IC card 1000 performs transfer of receiving/paying data or the like with the external device via the connecting unit 4.

In the foregoing configuration, the IC card 1000 for recording electronic money information is connected to the external device (not shown in FIG. 2) via the connecting unit 4 and thereby the MPU 2 of the IC card 1000 is connected to the external device. According to an input (instruction) from the external device, the MPU 2 then processes electronic money amount information stored in the data memory 3.

This IC card 1000 is used, for example in the following manner. A user inserts the IC card 1000 in the electronic money ATM (described later in detail) of a bank or the like and requests electronic money to be issued through this ATM. Upon receiving such a request, the host computer of the bank reduces an amount equivalent to the request from the account of the user, issues electronic money equivalent to the reduced amount and stores the same in the data memory 3 of the IC card 1000 of the user through the ATM. Also, the user can change electronic money into cash through the ATM or deposit money by using electronic money.

The user can carry this IC card 1000 instead of a purse. For example, when doing shopping in a store or the like, the user can pay by inserting the IC card 1000 into a POS terminal (described later in detail) installed in the store. The electronic money paid by the user through the POS terminal or the ATM is transmitted and settled in a center for issuing electronic money.

The foregoing IC card 1000 is, as shown in FIG. 1, functionally constructed by an electronic money distribution and storage control unit 100, an electronic money payment executing unit 200, a storage 300 and a prohibiting unit 600.

The storage 300 holds electronic money so as to be rewritten when currency of a single kind is used as previously described. The storage 300 is equivalent to the data memory 3 shown in FIG. 2.

The storage 300 includes, as shown in FIG. 1, a storing unit 310 composed of a plurality of storage areas (pockets) 301-1 to 301-N. The storage areas 301-1 to 301-N may be simply referred to as storage areas (pockets) 301 for convenience, hereinafter.

Each of the storage areas 301 is defined according to the use of electronic money. The storage area 301 classifies electronic money and various bits of accompanying information according to purposes and stores the same when currency of a single kind is used.

The storing unit 310 and the storage areas 301 will be described later in detail by referring to FIG. 8.

The electronic money distribution and storage control unit 100 sets a plurality of storage areas 301 defined according to individual purposes in the storage 300 and distributes and stores electronic money in the plurality of storage areas 301 based on purposes as instructed. In other words, the control unit 100 functions as electronic money distribution and storage control means. This electronic money distribution and storage control unit 100 is equivalent to the MPU 2 shown in FIG. 2.

Specifically, the electronic money distribution and storage control unit 100 includes a storage area specifying unit 101, a storage processing unit 102, a movement processing unit 103 and a settling unit 104.

The storage area specifying unit 101 functions, when electronic money is read from the foregoing external device (i.e., ATM or electronic purse) and received and stored in the storage 300 of the IC card 1000, as specifying means for specifying a storage area 301 according to the use of the electronic money.

The storage area specifying unit 101 also functions, as described later, when electronic money possessed in the storage 300 is moved among the plurality of storage areas 301, as specifying means for specifying at least one of a storage area 301 as an electronic money transfer origin and a storage area 301 as an electronic money transfer destination (in the embodiment of the present invention, the storage area 301 as an electronic money transfer destination is specified).

The storage processing unit 102 functions, when electronic money is read from the foregoing external device and received and stored in the storage 300, as storing means for storing the electronic money in the storage area 301 specified by the storage area specifying unit 101.

The movement processing unit 103 functions, when electronic money possessed in the storage 300 is transferred among the plurality of storage areas 301, as moving means for moving the electronic money from the storage area 301 as an electronic money transfer origin specified by the storage area specifying unit 101 to the storage area 301 as an electronic money transfer destination.

In the IC card 1000 of the embodiment, when payment is executed by using electronic money possessed in the storage 300 and if payment cannot be made by the electronic money stored in the specified storage area 301 because of its shortage, electronic money can be moved from another storage area 301 to the storage area 301 where the shortage has occurred so as to make payment by borrowing electronic money stored in this storage area 301. The settling unit 104 functions, when electronic money is read from the external device and received and stored in the storage 300, as settling means for storing electronic money equivalent to the amount of the shortage in another storage area 301 and settling the shortage.

Each of the storage area specifying unit 101, the storage processing unit 102 and the movement processing unit 103 is equivalent to the control unit 21 shown in FIG. 2. The settling unit 104 is equivalent to the operation unit 22 shown in FIG. 2.

The electronic money payment executing unit 200 specifies, regarding electronic money stored in the storage 300, a desired storage area 301 among the plurality of storage areas 301 and executes payment by using electronic money stored in the specified storage area 301. In other words, the executing unit 200 functions as electronic money payment executing means. The electronic money payment executing unit 200 is equivalent to the MPU 2 shown in FIG. 2.

Specifically, the electronic money payment executing unit 200 includes a storage area specifying unit 201, a movement processing unit 202 and a loan and debt information recording unit 203.

The storage area specifying unit 201 functions as specifying means for specifying a storage area 301 according to its purpose when payment is made by using electronic money possessed in the storage 300, and specifying, if payment cannot be made by using electronic money stored in the specified storage area 301 because the balance of the electronic money stored therein is below the amount of payment (i.e., the shortage of electronic money), another storage area 301 in order to make payment by using electronic money borrowed therefrom.

The movement processing unit 202 functions as moving means for moving, if the electronic money stored in the specified storage area 301 cannot be used when making payment by the electronic money possessed in the storage 300, the electronic money from another storage area 301 specified by the storage area specifying unit 201 to the storage area 301 where the shortage has occurred.

The loan and debt information recording unit 203 records, when moving the electronic money from another storage area 301 by the movement processing unit 202 to the storage area 301 where the shortage has occurred, numbers (later described pocket numbers) for identifying the storage area 301 where the shortage has occurred [i.e, storage area 301 as an electronic money transfer destination (borrowing side)] and the storage area 301 from which the electronic money has been lent to the storage area 301 of the shortage [i.e., storage area 301 as an electronic money transfer origin (lending side)] and loan and debt information (later described lending and borrowing information) regarding the amount of moved electronic money (amount of the shortage) or the like in a specified portion of each storage area 301 of the storage 300. In other words, this information recording unit 203 functions as loan and debt information recording means.

The movement processing unit 202 and the loan and debt information recording unit 203 are equivalent to the control unit 21 shown in FIG. 2.

The prohibiting unit 600 functions as prohibiting means for prohibiting/permitting the electronic money distribution and storage control unit 100 or the electronic money payment executing unit 200 to write/read electronic money to/from each storage area 301. The prohibiting unit 600 is equivalent to the control unit 21 shown in FIG. 2.

It can thus be understood that the IC card 1000 is a medium for holding electronic money defined as an electronic symbol of currency so as to be rewritten in the required storage 300. In the storage 300 of the medium, a plurality of storage areas 301 defined according to individual purposes are set when currency of a single kind is used. Electronic money is then distributed and stored in the plurality of storage areas 301 according to purposes as instructed.

To further describe the foregoing storing unit 310 and the storage area 301, specifically, in the storage 300, a storing unit 310 like that shown in FIG. 8 is formed. In this storing unit 310, plurality of storage areas (pockets) 301-1 to 301-N defined according to individual purposes [simply referred to as storage areas (pockets) 301 for convenience] are formed (equivalent to the respective lines of FIG. 8). Each pocket 301 (storage area 301 will be referred to as a pocket 301 in the embodiment, hereinafter) is used to record information regarding "a pocket number", "a using state", "currency", "a balance", "lending information", "borrowing information", "lock", "notes/purposes", or the like (equivalent to each column of FIG. 8).

The "pocket number" section is for recording numbers (P1 to Pn) used to identify pockets 301. The "using state" is for recording a flag used to identify a currently selected pocket 301. A numeral "1" is recorded only in the currently selected pocket 301 while numerals "0" are recorded in the other non-selected pockets 301.

The "currency" section is for recording information used to identify the currency variety [¥(yen), $(dollar) or the like] of electronic money stored in each pocket 301. The "balance" section is for recording the balance of electronic money stored in each pocket 301.

The "lending information" section is for recording lending information including the amount of lending and a pocket number as a borrowing side by the loan and debt information recording unit 203 when electronic money is lent to the other pocket 301 as described above. Likewise, the "borrowing information" section is for recording borrowing information including the amount of borrowing and a pocket number as a lending side by the loan and debt information recording unit 203 when electronic money is borrowed from the other pocket 301.

The "lock" section is for recording information (lock ON/lock OFF) used to identify the prohibition/permission of the use of each pocket 301. The section of "notes/purposes" is for recording notes including the purpose of electronic money stored in each pocket 301.

The IC card 1000 thus constructed is connected to the foregoing external device 400 via the connecting unit 4 (see FIG. 2).

The external device 400 includes a displaying unit 401 (e.g., the display screen of an electronic purse or a balance display is equivalent to the displaying unit 401) as displaying means for displaying various bits of information stored in the storage 300 (e.g., balance, lending information, borrowing information and notes/purposes for each storage area 301 recorded in the storing unit 310).

In practice, in the electronic money managing and possessing apparatus 10 of the embodiment, functions equivalent to the electronic money distribution and storage control unit 100 and the electronic money payment executing unit 200 are performed as the functions of the MPU 2. Specifically, these functions are performed by reading electronic money management and possession programs recorded in a recording medium (not shown) such as the ROM 23 of the IC card 1000 or a disk device in the external device 400 in the RAM 24 of the IC card 1000 and starting execution of these programs in the MPU 2 (specifically, by the control unit 21 and the operation unit 22) (see FIG. 2).

The electronic money management and possession programs are used to cause the computer to execute an electronic money distribution and storage control procedure for distributing and storing electronic money in a plurality of storage areas 301 according to purposes as instructed, the plurality of storage areas 301 being defined according to individual purposes in a required storage 300 of a medium 500 for holding the electronic money so as to be rewritten, and to execute an electronic money payment executing procedure for specifying, regarding the electronic money possessed in the medium 500, a desired storage area 301 and executing payment with electronic money stored in the specified storage area 301.

The electronic money management and possession programs are recorded in, for example a not shown CD-ROM. These programs are stored in the ROM 23 of the IC card 1000 or the disk device (not shown) of the external device 400 beforehand and then used. In other words, the CD-ROM or the disk device of the external device 400 is equivalent to the recording medium for recording the electronic money management and possession programs to be read by the computer.

(a2) Mode of using electronic money managing and possessing apparatus

This sub-section describes the mode of using the IC card 1000 described above in the sub-section (a1) as the external device 400 in combination with (1) a POS system, (2) an electronic purse, (3) an electronic money ATM and (4) a balance display.

(1) POS System

Figure 3:
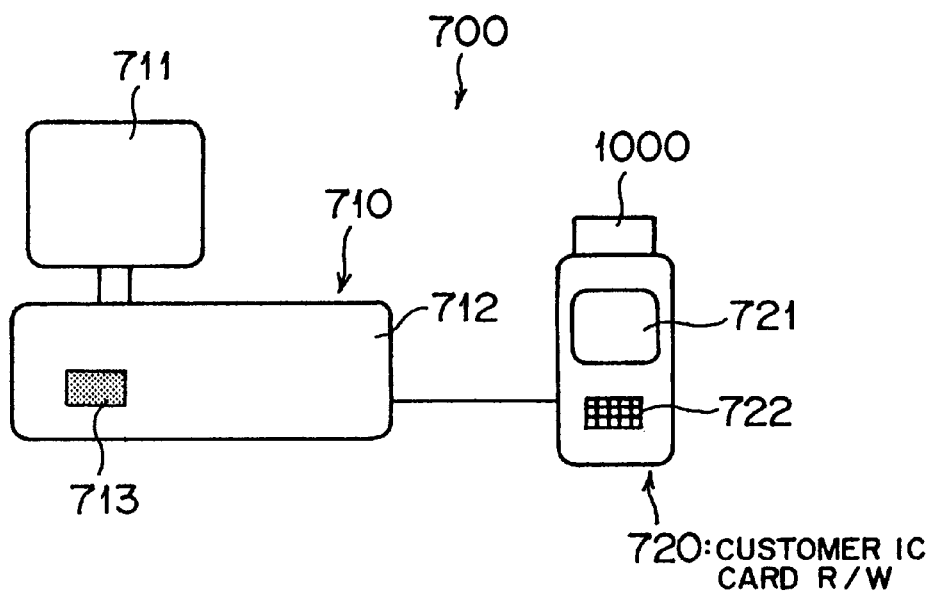
FIG. 3 is a typical view showing an appearance of a POS system in the electronic money managing and possessing apparatus of the embodiment of the invention.

Referring to FIG. 3 which is a typical view, there is shown an appearance of a POS terminal in the POS system. This POS terminal denoted by a reference numeral 700 is installed in, for example a store or the like. As shown in FIG. 3, the POS terminal 700 includes a POS main body 710 and a customer IC card reader/writer (customer IC card R/W) 720.

The POS main body 710 includes a display panel 711 as displaying means and a casing unit 712. The casing unit 712 includes an electronic money storing IC 713. The customer IC card R/W 720 includes a display panel 721 and an operation unit (KB) 722. The IC card 1000 can be inserted and connected to this customer IC card R/W 720. By inserting the IC card 1000 into the customer IC card R/W 720 and operating the operation unit 722, a customer can pay for purchases by using electronic money recorded in the IC card 1000 feeling as if using cash.

(2) Electronic Purse

Figure 4:
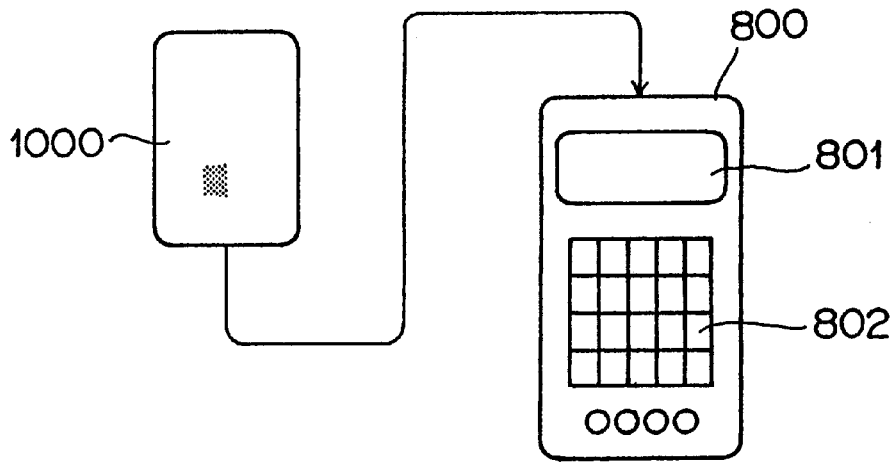
FIG. 4 is a typical view showing an appearance of an electronic purse in the electronic money managing and possessing apparatus of the embodiment of the invention.

Referring to FIG. 4 which is a typical view, there is shown an appearance of an electronic purse. As shown in FIG. 4, this electronic purse denoted by a reference numeral 800 includes a display panel 801, an operation unit 802 and a not shown data memory. This data memory includes a plurality of pockets 301 like those shown in FIGS. 8 and 9. Electronic money can be recorded in these pockets.

The IC card 1000 can be inserted and connected to the electronic purse 800. By inserting the IC card 1000 into this electronic purse 800 and operating the operation unit 802, the balance of electronic money registered in the IC card 1000 or the data memory of the electronic purse 800 can be displayed on the display panel 801. For security purposes, each pocket 301 can be locked to prohibit its use. In addition, the electronic money can be used to pay for public utility charges and transferred with other IC cards 1000.

(3) Electronic Money ATM Terminal

Figure 5:
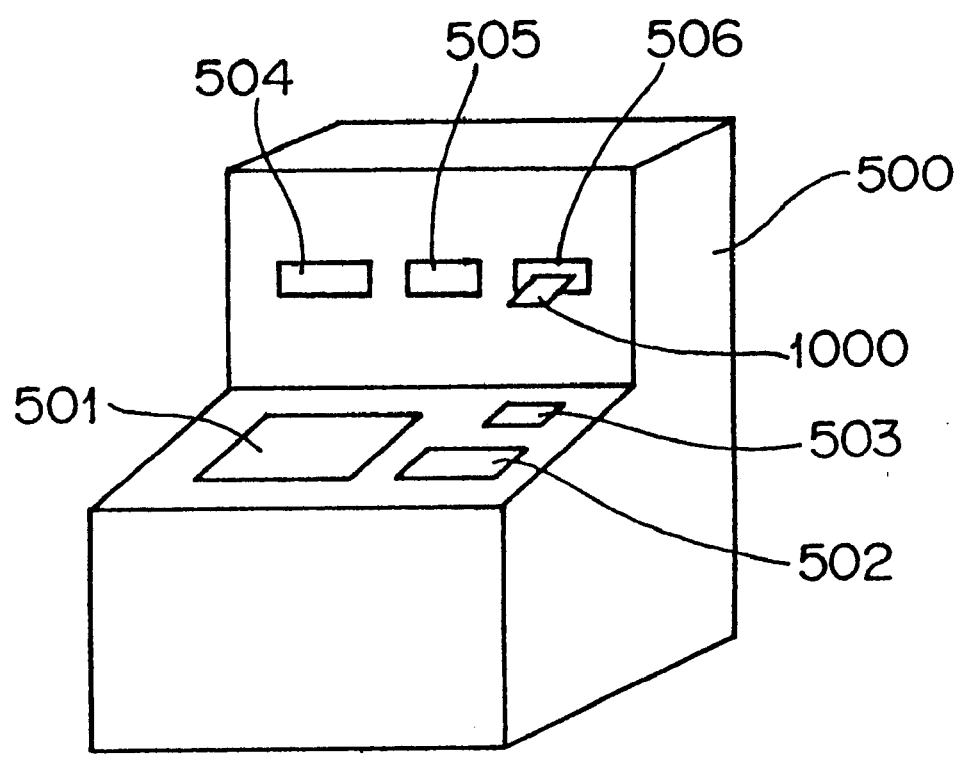
FIG. 5 is a typical perspective view showing an appearance of an electronic money automatic teller machine in the electronic money managing and possessing apparatus of the embodiment of the invention.

Referring to FIG. 5 which is a typical perspective view, there is shown an appearance of an electronic money ATM. As shown in FIG. 5, this ATM denoted by a reference numeral 500 includes a touch-panel type display/operation panel unit 501, a paper money dispensing port 502, a coin dispensing port 503, a bankbook inserting port 504, a cash card inserting port 505 and an IC card inserting port 506 for inserting the IC card 1000.

By inserting the IC card 1000 into the IC card inserting port 506 of the electronic money ATM 500 and operating the display/operation panel 501, for example, a bank deposit can be moved to the IC card 1000 or conversely, electronic money recorded in the IC card 1000 can be deposited in a bank account.

(4) Balance Display

Figure 6:
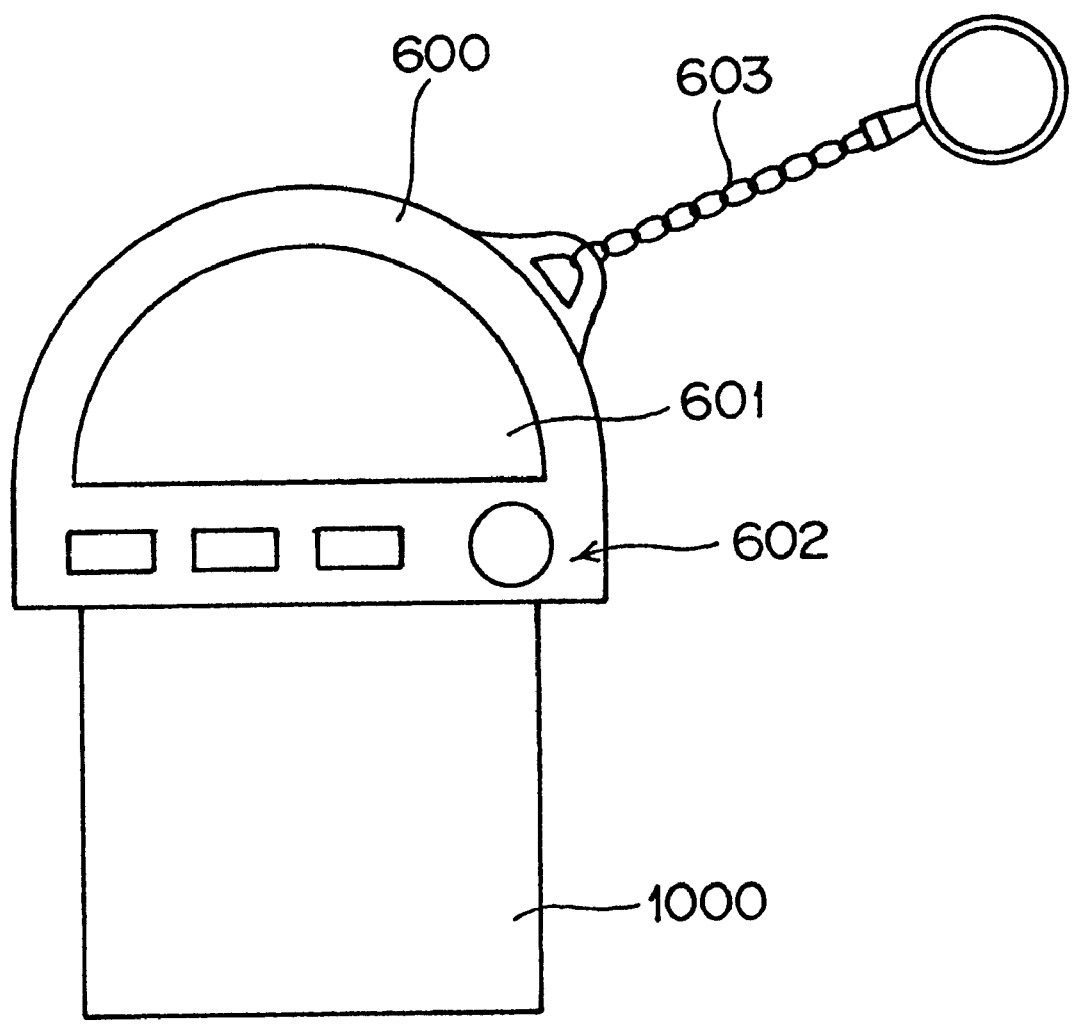
FIG. 6 is a typical perspective view showing an appearance of a balance display in the electronic money managing and possessing apparatus of the embodiment of the invention.

Referring to FIG. 6 which is a typical view, there is shown an appearance of a balance display. As shown in FIG. 6, this balance display denoted by a reference numeral 600 includes a display panel 601, an operation unit 602 and a key holder unit 603 for improving its portability. The IC card 1000 can be inserted and connected to the balance display 600. By inserting the IC card 1000 into the balance display 600 and operating the operation unit 602, the balance of electronic money registered in the IC card 1000 can be displayed. For security purposes, each pocket of the data memory 3 in the IC card 1000 can be locked/unlocked.

(b) Operation of Electronic Money Managing and Possessing Apparatus of the Embodiment of the Present Invention (b1) Operation of electronic money managing and possessing apparatus In the electronic money managing and possessing apparatus 10 of the embodiment of the present invention, which is constructed in the manner described above in the subsection (a1), the electronic money distribution and storage control unit 100 distributes and stores electronic money in the plurality of pockets (storage areas) 301 according to purposes as instructed, the plurality of pockets 301 being defined according to individual purposes in the storage 300 in the medium 500 (IC card 1000 in the embodiment). The electronic money payment executing unit 200 specifies, regarding the electronic money possessed in the medium 500, a desired pocket (storage area) 301 and executes payment by using the electronic money stored in the specified pocket (storage area) 301.

Figure 7:
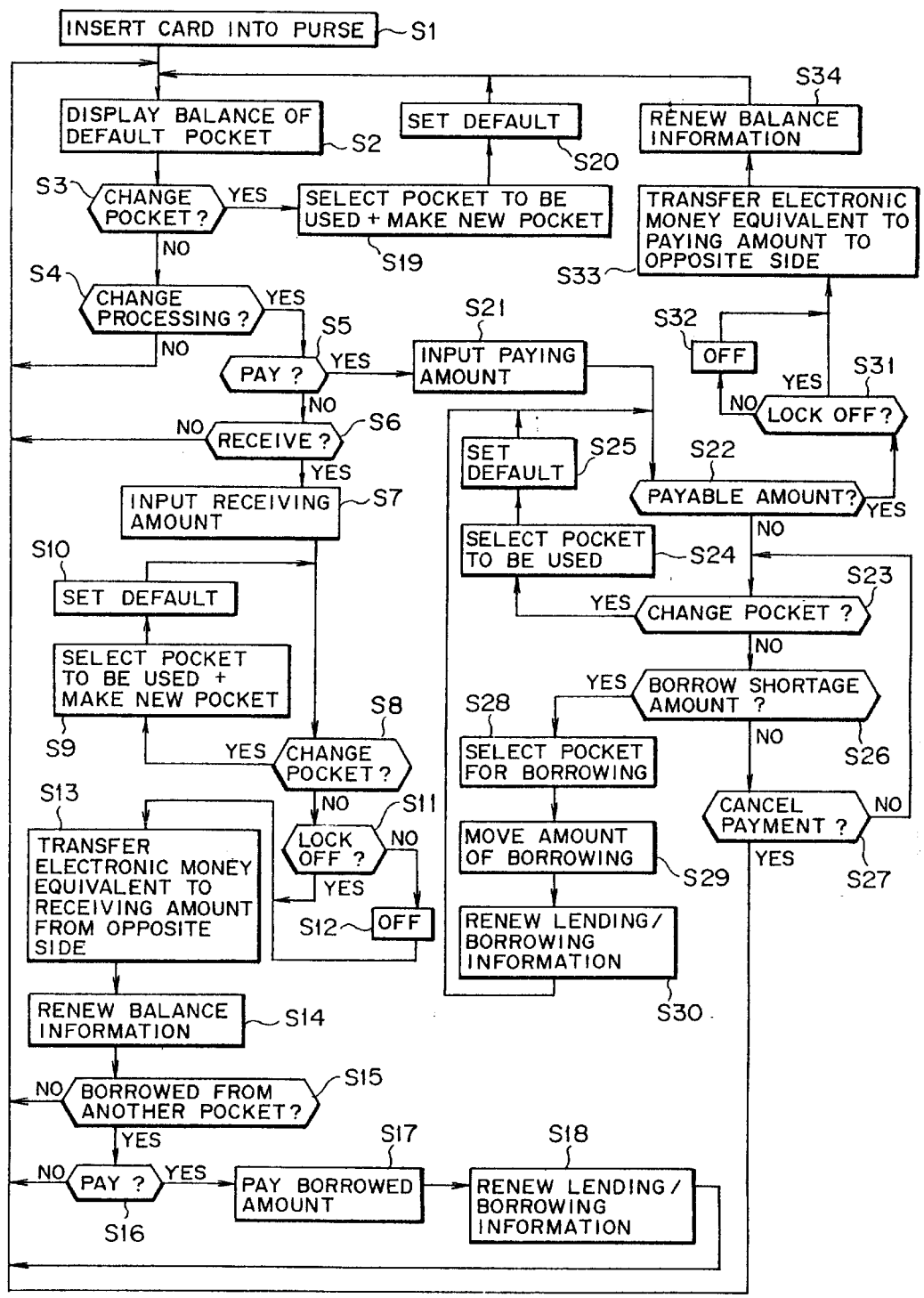
FIG. 7 is a flowchart illustrating an operation of the electronic money managing and possessing apparatus of the embodiment of the invention.

Next, the functions of the electronic money managing and possessing apparatus 10 of the embodiment of the present invention will be described in detail by referring to FIGS. 1 and 7. FIG. 7 is a flowchart (step S1 to S34) illustrating the transfer of electronic money performed by using the IC card 1000 and the electronic purse 800 (see FIG. 4).

First, by inserting the IC card 1000 into an inserting port formed in the electronic purse 800 (step S1), the connecting unit 4 of the IC card 1000 is connected to the electronic purse 800, and then the balance of the default pocket (pocket first selected at the time of starting) of the IC card 1000 is displayed on the display panel 801 of the electronic purse 800 (step S2).

Then, a user determines whether the default pocket displayed on the display panel 801 can be used as a pocket 301 for processing or not (step S3). If the pocket 301 should be changed (YES route of step S3), the user specifies another pocket 301 by the storage area specifying unit 101 and then selects this specified pocket 301 (step S19). In this case, the user can also form a new pocket 301 (step S19).

Then, the electronic money distribution and storage control unit 100 sets the newly selected or formed pocket 301 as a default pocket (step S20), and displays the balance of the default pocket again (step S2).

When performing processing for the (selected) pocket 301 displayed on the display panel 801 of the electronic purse 800 (see NO route of step S3), the user again determines whether a processing change should really be made or not (step S4). If no processing change is to be made for the selected pocket 301 (see NO route of step S4), the user returns the process to the state (step S2) immediately after the IC card 1000 has been inserted into the electronic purse 800.

For making a processing change for the selected pocket 301 (YES route of step S4), first, the user determines whether processing to be made is payment or not (step S5). If the processing is not payment (see NO route of step S5), the user then determines whether the processing to be made is receiving or not (step S6). If no receiving is to be performed (see NO route of step S6), the user returns the process to the state (step S2) immediately after the IC card 1000 has been inserted into the electronic purse 800.

If receiving is to be performed (YES route of step S6), first, the user inputs a receiving amount by using the operation unit 802 of the electronic purse 800 (step S7). Then, the user again determines whether processing can be performed for the selected pocket 301 or not (step S8). For changing the pocket 301 to be processed (YES route of step S8), the user specifies another pocket 301 by using the storage area specifying unit 101 and then selects this specified pocket 301 (step S9). In this case, the user can also form a new pocket 301 (step S9).

Then, the electronic money distribution and storage control unit 100 sets the newly selected or formed pocket 301 as a default pocket (step S10). The user again determines whether the pocket 301 for processing should be changed or not (step S8).

If no change is to be made for the pocket 301 and thus processing is to be made for the selected pocket 301 (see NO route of step S8), the electronic money distribution and storage control unit 100 determines whether the pocket 301 for processing has been locked or nor by the prohibiting unit 600 (step S11). If the pocket 301 for processing has not been locked (YES route of step S11), electronic money equivalent to the receiving amount inputted from the operation unit 802 in step S7 is then moved from the pocket 301 (pocket of the memory of the electronic purse 800 or pocket of the data memory 3 in another IC card 1000) of an opposite side to the selected pocket 301 by the movement processing unit 103 (step S13). The electronic money is stored in the pocket 301 as a transfer destination by the storage processing unit 102, and then the electronic money distribution and storage control unit 100 renews balance information (step S14).

On the other hand, if the pocket 301 for processing has been locked by the prohibiting unit 600 (see NO route of step S1), the user releases the locking of the prohibiting unit 600 by inputting a password from the operation unit 802 (step S12). Then, as in the foregoing case, electronic money equivalent to the receiving amount inputted from the operation unit 802 in step S7 is moved from the pocket (pocket of the memory of the electronic purse 800 or pocket of the memory in another IC card 1000) of the opposite side to the selected pocket 301 by the movement processing unit 103 (step S13). The electronic money is stored in the pocket 301 as a transfer destination by the storage processing unit 102, and then the electronic money distribution and storage control unit 100 renews balance information (step S14).

When electronic money is deposited in the selected pocket 301, lending and borrowing information regarding the pocket 301 is displayed on the displaying unit 401 by the loan and debt information recording unit 203. Then, the electronic money distribution and storage control unit 100 determines whether the selected pocket 301 has borrowed any money from another pocket 301 or not (step S15). If no borrowing is determined (NO route of step S15), then the process returns to step S2.

If borrowing of the selected pocket 301 from another pocket 301 is determined (YES route of step S15), then determination is made as to whether payment of the debt is made or not by the settling unit 104 (step S16).

If no debt payment is to be made (NO route of step S16), then the process returns to the state (step S2) immediately after the IC card 1000 has been inserted into the electronic purse 800. If debt payment is to be made (YES route of step S16), then the debt payment is made between the pockets 301 by the settling unit 104 (step S17). Then, after renewing lending and borrowing information by the loan and debt information recording unit 203 (step S18), the process returns to step S2.

On the other hand, if payment is to be made (YES route of step S5), then the user inputs the amount of payment by using the operation unit 802 of the electronic purse 800 (step S21). Then, the electronic money payment executing unit 200 (alternatively the user) determines whether the amount of payment inputted in step S21 can be made or not by the selected pocket 301 (step S22).

If payment cannot be made by the selected pocket 301 (No route of step S22), then the electronic money payment executing unit 200 determines whether the pocket 301 for processing should be changed or not (step S23). If the pocket 301 for processing should be changed to anther (YES route of step S23), another pocket 301 is specified by the storage area specifying unit 201 and this specified pocket 301 is selected (step S24). Then, the electronic money payment executing unit 200 sets the selected pocket 301 as a default pocket (step S25). The electronic money payment executing unit 200 (alternatively the user) again determines whether payment can be made or not by the selected pocket 301 (step S22).

If the pocket 301 for processing should not be changed to another (NO route of step S23), then the electronic money payment executing unit 200 determines whether an amount equivalent to the shortage is borrowed from another pocket 301 or not (step S26). For borrowing the amount equivalent to the shortage from another pocket 301 (YES route of step S26), a pocket 301 for borrowing is specified by the storage area specifying unit 201 and this specified pocket 301 is selected (step S28). Then, electronic money is moved from the pocket 301 of a lending side to the (selected) pocket 301 of a borrowing side by the movement processing unit 202 (step S29). After lending and borrowing information has been renewed by the loan and debt information recording unit 203, the electronic money payment executing unit 200 again determines whether the amount of payment inputted in step S21 can be paid or not by the selected pocket 301 (step S22).

If the amount equivalent to the shortage is not to be borrowed from another pocket 301, the electronic money payment executing unit 200 then determines whether the payment is canceled or not (step S27). If no cancellation of the payment is to be made (NO route of step S27), the electronic money payment executing unit 200 (alternatively the user) again determines whether the amount of payment inputted in step S21 can be paid or not by the selected pocket 301 (step S22). For canceling the payment (YES route of step S27), the process returns to step S2.

On the other hand, if the payment can be made by the selected pocket 301 (YES route of step S22), then the electronic money payment executing unit 200 determines whether the pocket 301 for processing has been locked or not by the prohibiting unit 600 (step S31). If the pocket 301 for processing has not been locked (YES route of step S31), electronic money equivalent to the amount of payment inputted from the operation unit 802 of the electronic purse 800 in step S21 is moved from the selected pocket 301 to the opposite side (pocket of the memory of the electronic purse 800 or pocket of the memory in another IC card 1000) by the movement processing unit 202 (step S33). Then, the electronic money payment executing unit 200 renews balance information regarding each pocket 301 of the data memory 3 in the IC card 1000 (step S34).

On the other hand, if the pocket 301 for processing has been locked (NO route of step S31), the user releases its locking by the prohibiting unit 600 by inputting a password from the operation unit 802 (step S32). Then, electronic money equivalent to the amount of receiving inputted from the operation unit 802 in step S21 is moved from the selected pocket 301 to the opposite side (pocket of the memory of the electronic purse 800 or pocket of the memory in another IC card 1000) by the movement processing unit 202 (step S33). The electronic money payment executing unit 200 then renews balance information regarding each pocket of the memory in the IC card 1000 (step S34) and then the process returns to step S2.

As apparent from the foregoing, with the electronic money managing and possessing apparatus of the embodiment of the present invention, since pockets 301 can be used in one IC card individually according to purposes when electronic money of a single currency kind is used, the user can use electronic money feeling as if using cash for various purposes and, by utilizing a non-bulky characteristic of the electronic money, its convenience can be increased.

Furthermore, when electronic money is moved from another pocket 301 to a pocket 301 where a shortage of payment has occurred, since lending and borrowing information can be recorded in the loan and debt information recording unit 203, lending and borrowing information can be managed for any lending and borrowing of electronic money managed according to each purpose. Accordingly, electronic money management and use can be facilitated.

(b2) Mode of using electronic money managing and possessing apparatus

This sub-section describes the mode of using, when currency of a single kind is used, electronic money stored in a plurality of pockets 301 defined according to purposes by an IC card 1000 in combination with (1) a POS system, (2) an electronic purse, (3) an electronic money ATM and (4) a balance display in the electronic money managing and possessing apparatus of the embodiment of the present invention.

(1) POS System

The process of purchasing goods with electronic money by using an IC card and a POS system in the electronic money managing and possessing apparatus of the embodiment of the present invention will be described by referring to FIGS. 8 to 13.

Figure 11:
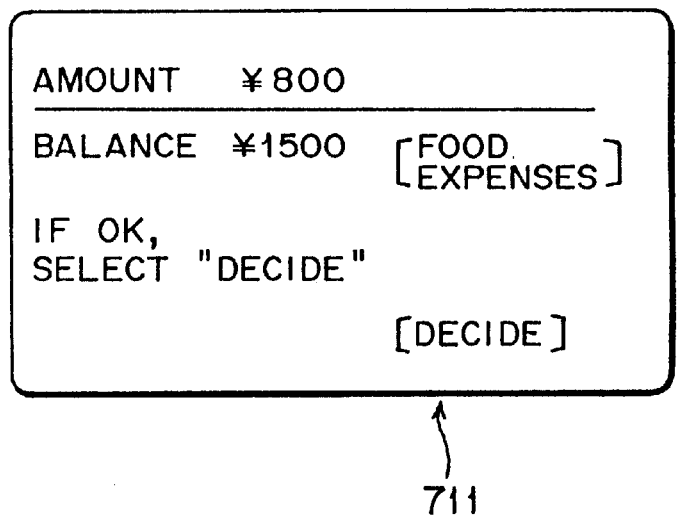
Figure 12:
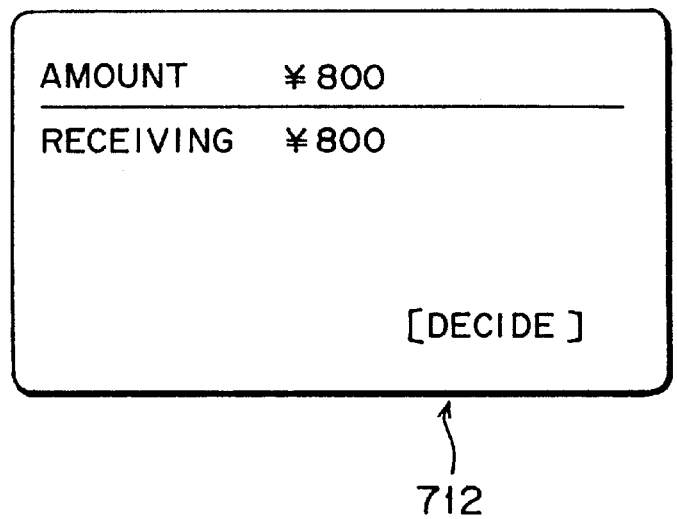
FIG. 12 is a view showing a display screen of the POS main body of the POS system in the electronic money managing and possessing apparatus of the embodiment of the invention.

FIGS. 9 and 12 each illustrates the display screen of the POS main body of the embodiment. FIGS. 10 and 11 each illustrates the display screen of a customer IC card R/W of the embodiment. FIG. 13 illustrates the configuration of a storing unit, in other words renewed memory information in the IC card.

Making a purchase by using the IC card 1000 having memory information like that shown in FIG. 8 and making payment by using a POS terminal like that shown in FIG. 3 go as follows.

A customer inserts into a customer IC card R/W 720 an IC card 1000 in which electronic money has been recorded. Then, by operating an operation unit 722, the customer can make a purchase with the electronic money registered in the IC card 1000 as in the case of using cash. In the following embodiment, it is assumed that the amount of its payment is ¥800.

For making payment, first, a store clerk notifies the customer of a purchase amount displayed on the POS screen. After confirming that the customer intends to pay with the electronic money, the clerk inputs, by using a POS main body 710, that paying means is electronic money. FIG. 9 illustrates the screen of the display panel 711 of the POS main body 710 in this state.

Upon having confirmed that the purchase is paid for with the electronic money, the clerk instructs the customer to insert into the customer IC card R/W 720 his/her IC card 1000 in which electronic money has been recorded. Then, the customer inserts the IC card 1000 into the customer IC card R/W 720. FIG. 10 illustrates the screen of the display panel 721 of the customer IC card R/W 720 in this state.

As shown in FIG. 10, a requested paying amount (¥800 in the embodiment), a balance of a default pocket (P1) and notes/information regarding purposes are displayed on the screen of the display panel 721 of the customer IC card R/W 720. Also, a message for confirming execution of payment from a currently selected pocket 301 is displayed.

Upon having received the foregoing message, the customer selects "DECIDE" from the operation unit 722 of the customer IC card R/W 720. Then, the screen of the display panel 721 of the customer IC card R/W 720 is changed as shown in FIG. 11. On the other hand, the screen of the display panel 711 of the POS main body seen by the clerk is changed as shown in FIG. 12.

After the customer has selected "DECIDE" from the customer IC card R/W 720, as shown in FIG. 13, the movement processing unit 202 (see FIG. 1) moves an amount of electronic money equivalent to the price of purchased goods (¥800) from his/her IC card 1000 to an IC in the POS terminal, the electronic money having been recorded in the P1 pocket 301 as part of electronic money recorded in the data memory 3 of the IC card 1000. Then, the electronic money payment executing unit 200 renews memory information in the IC card 1000. The process of making purchases in a store has just been described.

(2) Electronic Purse

Figure 14:
FIG. 14 is a view showing yet another constitutional example of the storing unit.

Next, the process of paying for public utility charges by using an IC card and an electronic purse in the electronic money managing and possessing apparatus of the embodiment of the present invention will be described. FIG. 14 illustrates the configuration of a storing unit, in other words memory information in the IC card.

As shown in FIG. 14, a storing unit 310 like that shown in FIG. 8 is also formed in the data memory 3 (storage 300) in the IC card 1000, and its detailed description will be omitted.

Making a purchase by using an IC card 1000 having memory information and making payment for public utility charges by using an electronic purse like that shown in FIG. 4 go as follows.

A user inserts into an electronic purse 800 an IC card 1000 in which electronic money has been recorded. Then, by operating the operation unit 802, the user can pay for public utility charges or the like with the electronic money registered in the IC card 1000 as in the case of using cash.

In the embodiment, it is assumed that memory information in the IC card 1000 before paying for public utility charges is in a state shown in FIG. 13 and, since payment for public utility charges has not been made yet, a current pocket P3 for public utility charges is placed in a lock-ON state (use prohibited) by the prohibiting unit 600 (see FIG. 1).

For paying for public utility charges with electronic money by the IC card 1000 having such memory information, first, the lock-ON state of the pocket P3 for public utility charges must be released.

For this IC card 1000, a password is set for each IC card 1000 or each pocket by the prohibiting unit 600 beforehand in order to perform locking ON/OFF. For releasing locking, the user inputs a pre-set password. Then, only if this inputted password coincides with the password set beforehand, the prohibiting unit 600 sets a lock flag to OFF by understanding that the owner has requested lock releasing. In this way, payment can be executed.

After the user has inputted the password and released the locking of the pocket P3 for public utility charges and thereby the state for permitting payment has been realized, then, the storage area specifying unit 201 (see FIG. 1) sets the pocket P3 for public utility charges for making payment. In other words, since a currently selected pocket is P1 as shown in FIG. 13, the pocket P3 is selected by the operation unit 802 of the electronic purse 800. FIG. 14 illustrates the memory information of the IC card 1000 in this state.

The operations hitherto described may be performed by using an electronic purse 800 owned by public utility charge collector or the user's own electronic purse 800 or personal computer (PC).

The user inserts the IC card 1000 set to make payment from the pocket P3 for public utility charges into the electronic purse 800 owned by the public utility charge collector. Then, by performing the same operation as that for the payment in the foregoing (1) POS system, the movement processing unit 200 (see FIG. 1) moves electronic money from the pocket P3 for public utility charges to the electronic purse 800 of the public utility charge collector. In this way, payment for public utility charges is made.

(3) Electronic Money ATM

Next, the process of withdrawing electronic money from a bank account by using an IC card and an electronic money ATM in the electronic money managing and possessing apparatus of the embodiment of the present invention will be described. FIGS. 15 to 19 each illustrates the display screen of the electronic money ATM of the embodiment.

A user inserts into an electronic money ATM 500 an IC card 1000 in which electronic money has been recorded. Then, by operating a display/operation panel unit 501, the user moves (withdraws) electronic money from his/her bank account to the IC card 1000 by the electronic money ATM. The specific process goes as follows.

The IC card 1000 of the embodiment includes a magnetic strip (MS) unit for bank account information and a function of a general bank cash card. In the date memory 3 (storage 300) of the IC card 1000, a storing unit 310 like that shown in FIG. 8 is also formed, and its detailed description will be omitted. In the embodiment, it is assumed that the memory information of the IC card 1000 before withdrawing electric money from the bank account to the IC card 1000 is in a state shown in FIG. 14.

After the IC card 1000 has been inserted into the electronic money ATM (simply referred to as ATM, hereinafter) 500, the memory information of the IC card 1000 is read, and a screen like that shown in FIG. 15 is then displayed on the display/operation panel unit 501 of the ATM 500.

Figure 16:
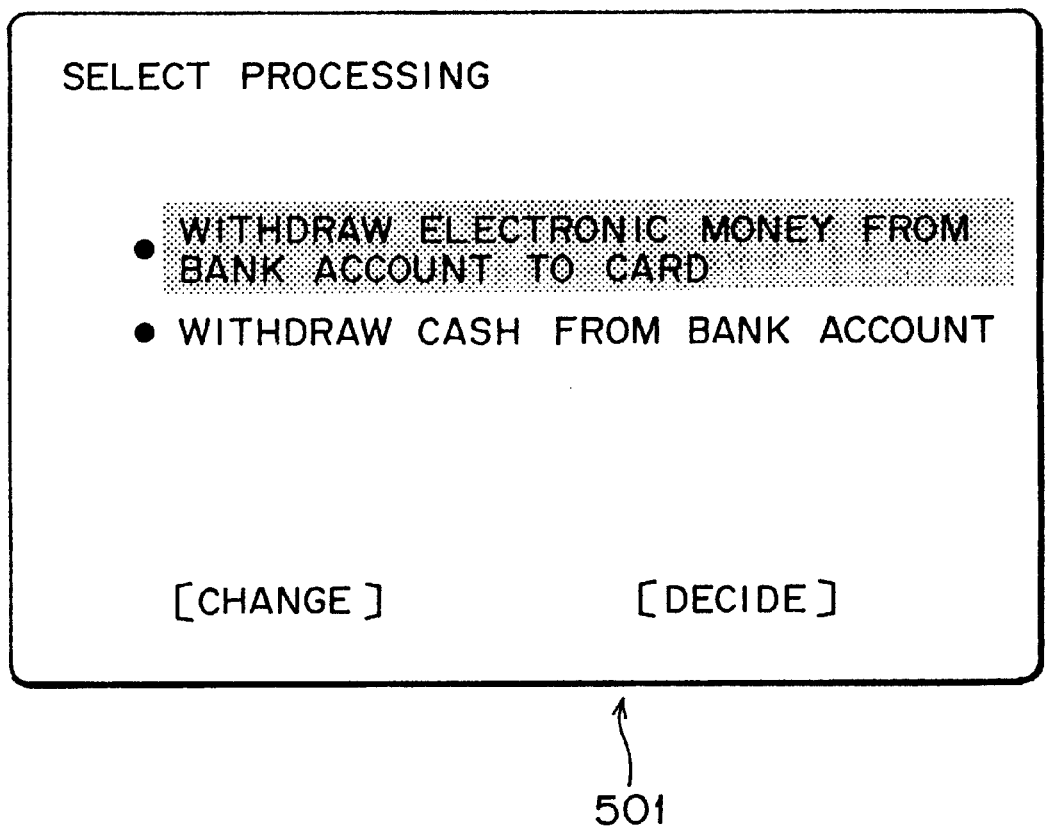

Then, the user selects and decides "WITHDRAW" from the display/operation panel unit 501 of the ATM 500. Then, a screen like that shown in FIG. 16 is displayed on the display/operation panel unit 501, and the user selects and decides "WITHDRAW ELECTRONIC MONEY FROM BANK ACCOUNT TO CARD".

After having selected the foregoing processing, first, as in the case of withdrawing cash from a bank account by using a usual bank credit card, screens for inputting a personal identification number and an amount to be withdrawn are displayed on the display/operation panel unit 501. Inputs are then made according to instructions displayed on these screens.

For making inputs, as shown in FIG. 17, since a screen is displayed for asking which pocket 301 the electronic money withdrawn from the bank account is deposited in, if the electronic money is to be deposited in the currently selected pocket 301, "DECIDE" displayed on the screen shown in FIG. 17 is selected. On the other hand, by selecting "SETTING CHANGE", the selected pocket 301 can be changed to another or information regarding the setting content of the pocket 301 or the like can be changed [equivalent to the storage area specifying unit 101 (see FIG. 1)].

Now, the process of setting a new pocket P6 and depositing money in this pocket P6 in the embodiment will be described. The pocket P6 is in a state in which nothing has been set yet.

The user selects "SETTING CHANGE" from the display/operation panel unit 501. Then, the user selects and decides a pocket for depositing money on a subsequently displayed screen shown in FIG. 18.

If "6" is selected on the screen shown in FIG. 18, a screen like that shown in FIG. 19 is then displayed on the display/operation panel unit 501. For registering purposes in a "NOTES" (i.e., "NOTES/PURPOSES" for memory information shown in FIG. 14) section, setting is performed by using the screen shown in FIG. 19.

After the storage area specifying unit 101 has selected the pocket P6 for depositing money, the storage processing unit 102 (see FIG. 1) moves the specified amount of electronic money from the bank account to the IC card 1000, and memory information in the IC card 1000 is then renewed.

There is no limit to contents to be set for "NOTES/PURPOSES". By the ATM, new contents may be inputted.

In the foregoing embodiment, information to be registered in the "NOTES/PURPOSES" section was inputted by using the ATM. Instead of the ATM, however, a PC or the like having an IC card R/W function may be used for setting.

(4) Balance Display

Next, the process of managing electronic money by using an IC card and a balance display in the electronic money managing and possessing apparatus of the embodiment of the present invention will be described. FIGS. 20 to 25 each illustrates a balance of each pocket formed in the data memory 3 of the IC card.

A storage area 310 like that shown in FIG. 8 is also formed in the data memory 3 (storage 300) in the IC card 1000 of the embodiment, and its detailed description will be omitted.

The process of making a purchase by using the IC card 1000 having memory information and managing electronic money by using a balance display like that shown in FIG. 6 goes as follows.

A user inserts into a balance display 600 an IC card 1000 in which electronic money has been recorded. Then, by operating an operation unit 602, the user can use and manage the electronic money registered in the IC card 1000 as in the case of managing cash in a purse.

Figure 20:
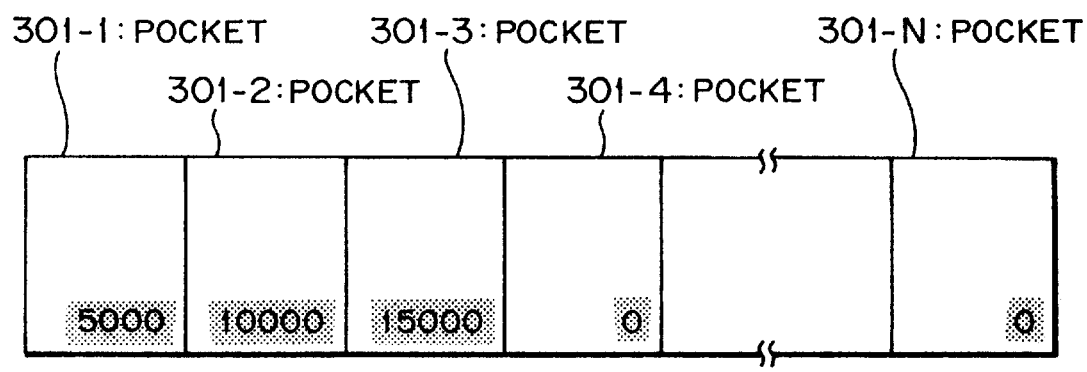
FIGS. 20 to 25 are views each showing a balance of each pocket of the storing unit of the IC card in the electronic money managing and possessing apparatus of the embodiment of the invention.

In the embodiment, as shown in FIG. 20, pockets 301-1 to 301-N amounting to N in number are formed as storage areas 301 in the data memory 3 (storage 300) of the IC card 1000. The user can freely store electronic money in any of these pockets 301-1 to 301-N.

In the embodiment, it is assumed that the pocket 301-1 is used for food expenses, the pocket 301-2 for social expenses and the pocket 301-3 for general expenses, and electronic money of a single currency kind, for example Japanese yen, has been stored in each pocket 301 of the IC card 1000. It is also assumed that at present, electronic money stored in the IC card 1000 amounts to a total of ¥30000, specifically ¥5000 in the pocket 301-1 (for food expenses), ¥10000 in the pocket 301-2 (for social expenses) and ¥15000 in the pocket 301-3 (for general expenses). FIG. 20 illustrates a balance of each pocket 301 of the IC card 1000 in this state.

Now, the process of using and managing electronic money by using the IC card 1000 and the balance display 600 will be described, taking as an example the action of an office worker. It is assumed herein that for making payment with electronic money, payment processing is performed by an operation similar to that for purchases performed by using the foregoing POS terminal.

Figure 21:
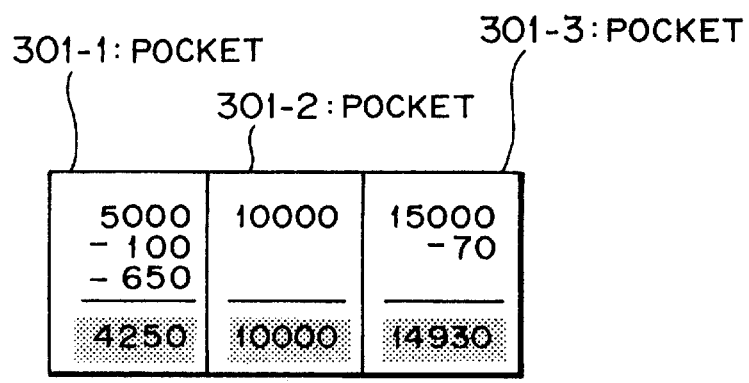

First, the office worker buys a paper at a kiosk with electronic money before getting on a train and pays ¥70 for the paper from the pocket 301-3 for general expenses. Then, in an office, he buys a cup of coffee and pays ¥100 for the coffee from the pocket 301-1 for food expenses. After the end of morning work, he orders set lunch of ¥650 at a cafeteria during a lunch break and pays ¥650 from the pocket 301-1 for food expenses. FIG. 21 illustrates the history and balance of electronic money stored in each pocket in his case. As shown in FIG. 21, the balance of the pocket 301-1 is ¥4250, the balance of the pocket 301-2 is ¥10000 and the balance of the pocket 301-3 is ¥1493.

After the lunch break, the office worker buys another cup of coffee in a spare moment from his work and pays ¥100 for the coffee from the pocket 301-1 for food expenses. Out of the office, he had dinner with his colleague, which cost him ¥5000. Since the balance of the pocket 301-1 was not enough, he borrowed a shortage ¥850 from the pocket 301-3 for general expenses.

Figure 22:
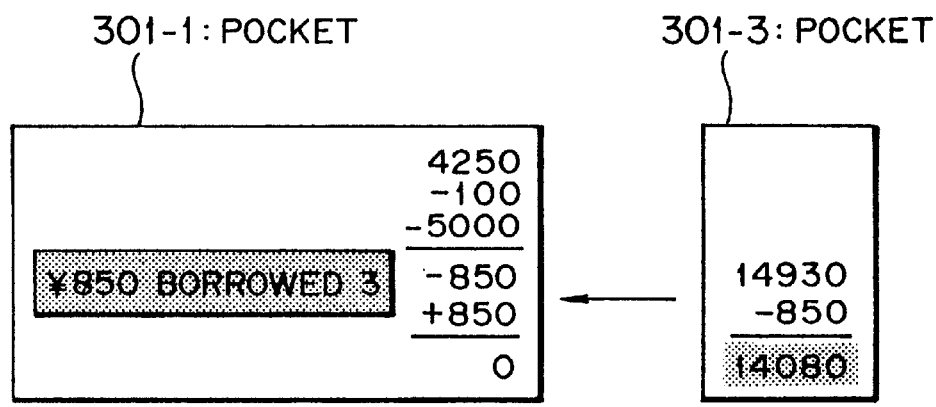

FIG. 22 illustrates the history and balance of electronic money in each pocket in the foregoing case. As shown in FIG. 22, the balance of the pocket 301-1 is ¥0 and the balance of the pocket 301-3 is ¥14080. The office worker borrowed ¥850 from the pocket 301-3 for the shortage of the pocket 301-1.

After the dinner, the office worker went to sing at KARAOKE (sing according to recorded music) and paid ¥3000 from the pocket 301-2 for social expenses.

Figure 23:
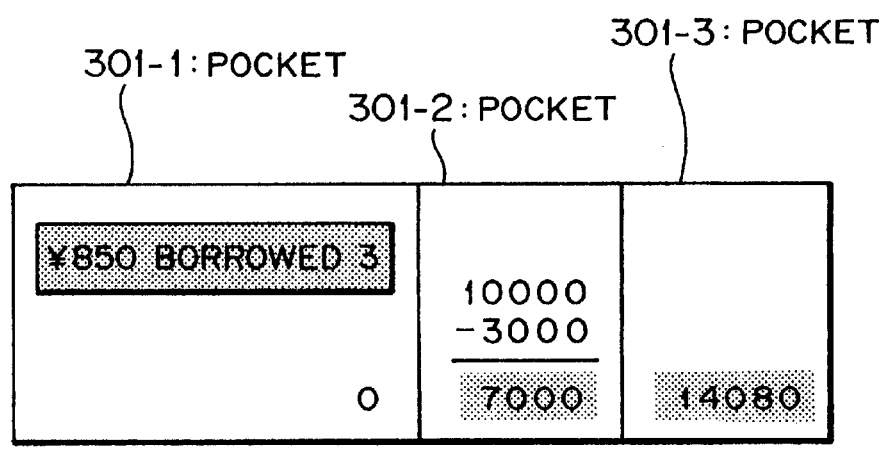

As a result, after the end of day's work, as shown in FIG. 23, for the IC card 1000, electronic money balances are ¥0 for the pocket 301-1, ¥7000 for the pocket 301-2 and ¥14080 for the pocket 301-3. In addition, information of "BORROWED ¥850 FROM POCKET 301-3" has been recorded in the pocket 301-1 by the loan and debt information recording unit 203 (see FIG. 1).

Figure 24:
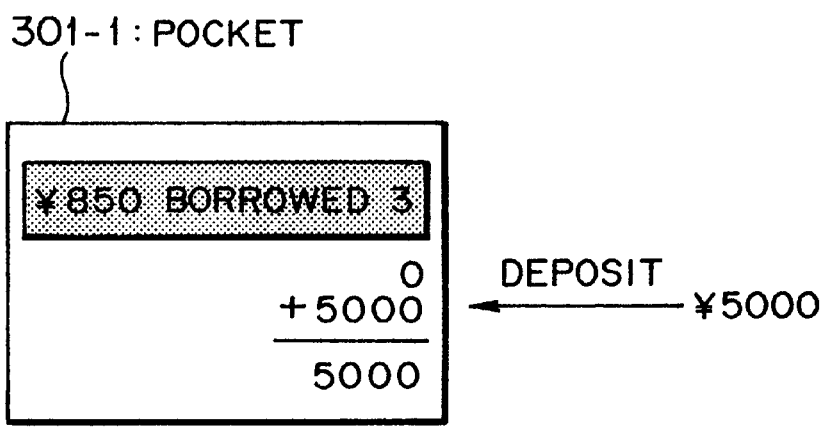

Next morning, the office worker deposits electronic money in the IC card by using the ATM 500 or the electronic purse 800 before going to work (see FIG. 24). The specific process goes as follows. For depositing ¥5000 in the pocket 301-1 in which the balance is ¥0, a message "MOVE ¥850 AS BORROWED AMOUNT OF POCKET 301-1 TO POCKET 301-3?" is displayed on the display/operation panel 501 of the ATM 500 as the displaying unit 401 (see FIG. 1) or the display panel 801 of the electronic purse 800.

Figure 25:
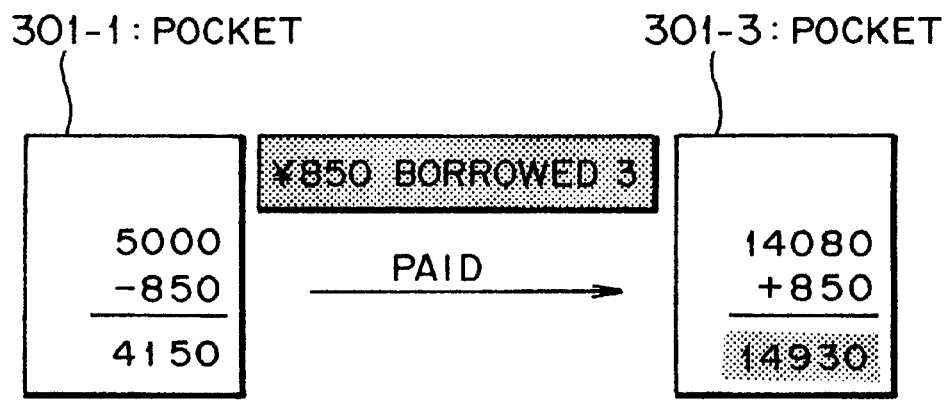

After the office worker selects "MOVE", loans and debts are settled among the pockets by the settling unit 104 (see FIG. 1) and then ¥850 as the borrowed amount is moved from the pocket 301-1 to the pocket 301-3. In this state, as shown in FIG. 25, the electronic money balances are ¥4150 for the pocket 301-1 and ¥14930 for the pocket 301-3. Since the balances of the pockets 301-2 and 301-3 are enough, these are kept intact.

(c) Others

In the foregoing embodiment, the IC card 1000 included inside the electronic money distribution and storage control unit 100, the electronic money payment executing unit 200 and the storage 300. The displaying unit 401 was provided in an external device such as the POS terminal 700, the electronic purse 800, the ATM 500 or the balance display 600. However, there is no limit to the arrangement of the displaying unit 401. For example, a displaying unit 400 may be provided in the IC card 1000. Also, only the storage 300 may be provided in the IC card 1000, and the electronic money distribution and storage control unit 100, the electronic money payment executing unit and the displaying unit 400 may be provided in an external device such as the POS terminal 700, the electronic purse 800, the ATM 500 or the balance display 600. It is thus apparent that various modifications and changes can be made without departing from the spirit and scope of the present invention.

Furthermore, in the foregoing embodiment, as shown in FIG. 1, in the IC card 1000, the prohibiting unit 600 was provided separately from prohibiting unit 600 was provided separately from the electronic money distribution and storage control unit 100 or the electronic money payment executing unit 200. However, there is no limit to the arrangement of the prohibiting unit 600. For example, the prohibiting unit 600 may be provided in the electronic money distribution and storage control unit 100 or the electronic money payment executing unit 200. It is thus apparent that various modifications and changes can be made without departing from the spirit and scope of the present invention.

What is claimed is:

1. An electronic money managing and possessing apparatus for managing and possessing electronic money, held in a medium, defined as an electronic symbol of currency in a required storage so as to be rewritten, comprising:

electronic money distribution and storage control means for setting a plurality of storage areas defined according to individual purposes in said storage in said medium, and distributing and storing electronic money in said plurality of storage areas according to individual purposes as instructed; and electronic money payment executing means for specifying, regarding said electronic money possessed in said medium, a desired storage area and executing payment with said electronic money stored in said specified storage area;

wherein said electronic money distribution and storage means includes specifying means for specifying at least one of a storage area as a transfer origin and a storage area as a transfer destination, and moving means for moving said electronic money from said storage area as a transfer origin to said storage area as a transfer destination specified by said specifying means.

2. An electronic money managing and possessing apparatus for managing and possessing electronic money, held in a medium, defined as an electronic symbol of currency in a required storage so as to be rewritten, comprising:

electronic money distribution and storage control means for setting a plurality of storage areas defined according to individual purposes in said storage in said medium, and distributing and storing electronic money in said plurality of storage areas according to individual purposes as instructed; and electronic money payment executing means for specifying, regarding said electronic money possessed in said medium, a desired storage area, and executing payment with said electronic money stored in said specified storage area;

wherein said electronic money payment executing means includes specifying means for specifying another storage area when shortage of electronic money stored in said desired storage area occurred, and moving means for moving electronic money from said another storage area to said desired storage area where said shortage has occurred.

3. An electronic money managing and possessing apparatus as claimed in claim 2, wherein said electronic money payment executing means includes, for moving said electronic money from said another storage area to said storage area where said shortage has occurred, loan and debt information recording means for recording lending and borrowing information in said medium.

4. An electronic money managing and possessing apparatus as claimed in claim 3, wherein said electronic money payment executing means further includes displaying means for displaying said lending and borrowing information.

5. An electronic money managing and possessing apparatus for managing and possessing electronic money, held in a medium, defined as an electronic symbol of currency in a required storage so as to be rewritten, comprising:

electronic money distribution and storage control means for setting a plurality of storage areas defined according to individual purposes in said storage in said medium, and distributing and storing electronic money in said plurality of storage areas according to individual purposes as instructed; and electronic money payment executing means for specifying, regarding said electronic money possessed in said medium, a desired storage area, and executing payment with said electronic money stored in said specified storage area;

wherein said electronic money payment executing means includes specifying means for specifying another storage area when shortage of electronic money stored in said desired storage area occurred, and moving means for moving electronic money from said another storage area to said desired storage area where said shortage has occurred, and said electronic money distribution and storage control means reads electronic money from an external side, and receives and stores said electronic money from said external side in said medium, includes settling means for storing electronic money equivalent to an amount of said shortage in said another storage area and settling said shortage.

6. An electronic money managing and possessing method for managing and possessing electronic money, held in a medium, defined as an electronic symbol of currency in a required storage so as to be rewritten, comprising the steps of:

possessing electronic money defined as an electronic symbol of currency in a medium by distributing and storing electronic money in a plurality of storage areas, defined according to individual purposes in said storage in said medium, according to individual purposes as instructed:

specifying at least one of a storage area as a transfer origin and a storage area as a transfer destination; and moving electronic money from said storage area as a transfer origin to said storage area as a transfer destination.

7. An electronic money managing and possessing method for managing and possessing electronic money, held in a medium, defined as an electronic symbol of currency in a required storage so as to be rewritten, comprising the steps of:

possessing electronic money defined as an electronic symbol of currency in a medium by distributing and storing electronic money in a plurality of storage areas, defined according to individual purposes in said storage in said medium, according to individual purposes as instructed;

specifying a desired storage area for making payment with electronic money possessed in said specified storage area;

specifying another storage area when shortage of electronic money stored in said desired storage area occurred; and moving electronic money from said another storage area to said desired storage area where said shortage has occurred.

8. An electronic money managing and possessing method as claimed in claim 7, wherein for moving said electronic money from said another storage area to said storage area where said shortage has occurred, lending and borrowing information is recorded in said medium.

9. An electronic money managing and possessing method as claimed in claim 8, wherein said lending and borrowing information is displayed.

10. An electronic money managing and possessing method as claimed in claim 7, wherein for moving said electronic money from said another storage area to said storage area where said shortage has occurred and then reading electronic money from an external side and receiving and storing said electronic money in said medium, electronic money equivalent to an amount of said shortage is stored in said another storage area and said shortage is settled.

* * * * *